(12) United States Patent
Rajagopalan et al.

(10) Patent No.: US 10,822,688 B2
(45) Date of Patent: Nov. 3, 2020

(54) SYSTEMS AND METHODS FOR TAILORED MICROSTRUCTURES USING TEMPLATED GRAIN NUCLEATION

(71) Applicants: Jagannathan Rajagopalan, Tempe, AZ (US); Rohit Sarkar, Tempe, AZ (US)

(72) Inventors: Jagannathan Rajagopalan, Tempe, AZ (US); Rohit Sarkar, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 16/521,996

(22) Filed: Jul. 25, 2019

(65) Prior Publication Data

US 2019/0345595 A1   Nov. 14, 2019

Related U.S. Application Data

(60) Division of application No. 15/458,693, filed on Mar. 14, 2017, now Pat. No. 10,385,440, which is a continuation of application No. PCT/US2015/059162, filed on Nov. 5, 2015.

(60) Provisional application No. 62/077,983, filed on Nov. 11, 2014.

(51) Int. Cl.
  *C23C 10/28* (2006.01)
  *C23C 10/04* (2006.01)
  *B82Y 40/00* (2011.01)

(52) U.S. Cl.
  CPC .............. *C23C 10/28* (2013.01); *C23C 10/04* (2013.01); *B82Y 40/00* (2013.01)

(58) Field of Classification Search
  CPC .......... B82Y 40/00; C23C 10/04; C23C 10/28
  See application file for complete search history.

(56) References Cited

U.S. PATENT DOCUMENTS

| | | |
|---|---|---|
| 5,893,949 A | 4/1999 | King et al. |
| 6,913,649 B2 | 7/2005 | Voutsas et al. |
| 2008/0182392 A1* | 7/2008 | Yeh .................. H01L 21/02532 438/486 |

FOREIGN PATENT DOCUMENTS

JP    2012-043941    3/2012

OTHER PUBLICATIONS

Padmaprabu et al. "Microstructural Characterisation of TiAl Thin Films Grown by DC Magnetron Co-Sputtering Technique". Materials Letters 43 (2000), pp. 106-113. (Year: 2000).*
International Search Report and Written Opinion for PCT/US2015/059162, dated Feb. 23, 2016.
Y Huang et al., "Advances in Ultrafine-Grained Materials", Materials Today, vol. 16, No. 3, pp. 85-90, Mar. 2013.

(Continued)

*Primary Examiner* — Alexander M Weddle
(74) *Attorney, Agent, or Firm* — Snell & Wilmer L.L.P.

(57) ABSTRACT

Methods for controlled microstructure creation utilize seeding of amorphous layers prior to annealing. Seed crystals are formed on an amorphous layer or layers. The material, size, and spacing of the seed crystals may be varied, and multiple seed layers and/or amorphous layers may be utilized. Thereafter, the resulting assembly is annealed to generate a crystalline microstructure. Via use of these methods, devices having desirable microstructural properties are enabled.

11 Claims, 20 Drawing Sheets

(56) References Cited

OTHER PUBLICATIONS

G He et al., "Novel Ti-base Nanostructure—Dendrite Composite with Enhanced Plasticity", Nature Materials, vol. 2, pp. 33-37, Jan. 2003.
T Waitz et al., "Martensitic Phase Transformations in Nanocrystalline NiTi Studied by TEM", Acta Materialia 52, pp. 137-147, 2004.
C Padmaprabu et al., "Microstructural Investigation of TiAl Thin Films Grown on (111) Oriented Silicon Substrate by DC Magnetron Sputtering", Scripta Materialia 44, pp. 1837-1840, 2001.
C Padmaprabu et al., "Microstructural Characterisation of TiAl Thin Films Grown by DC Magnetron Co-Sputtering Technique", Materials Letters 43, pp. 106-113, 2000.
FH Froes et al., "Synthesis, Properties and Applications of Titanium Aluminides", Journal of Materials Science 27, pp. 5113-5140, 1992.
C Suryanarayana et al., "Nanostructured Titanium Aluminides", Materials Science and Engineering, A179/A180, pp. 108-111, 1994.
C Suryanarayana et al., "Compaction and Characterization of Mechanically Alloyed Nanocrystalline Titanium Aluminides", Metallurgical and Materials Transactions A, vol. 28A, pp. 293-302, Feb. 1997.
FH Froes, "Titanium Aluminides: Science, Technology, Applications and Synthesis by Mechanical Alloying", Journal of Materials Science and Technology, vol. 10, pp. 251-262, 1994.
USPTO; Notice of Allowance in the U.S. Appl. No. 15/458,693 dated Apr. 12, 2019.
USPTO; Restriction Requirement in the U.S. Appl. No. 15/458,693 dated Jan. 10, 2019.

\* cited by examiner

Cross Sectional Microstructure
No Seed

Cross Sectional Microstructure
1 nm Ti Seed

Cross Sectional Microstructure
1 nm Ti Seed - Multilayer
2 seed layers along thickness Cross Sectional Microstructure
1 nm Ti Seed - Multilayer
1 seed layer along thickness Cross Sectional Microstructure
1 nm Ti Seed - Multilayer
4 seed layers along thickness (200 nm)

Multiple grains along thickness, equiaxed structure

SYSTEMS AND METHODS FOR TAILORED MICROSTRUCTURES USING TEMPLATED GRAIN NUCLEATION

CROSS-REFERENCE TO RELATED APPLICATIONS

This application is a divisional of U.S. Ser. No. 15/458,693 filed on Mar. 14, 2017, now U.S. Patent Application Publication No. 2017-0183766 entitled "SYSTEMS AND METHODS FOR TAILORED MICROSTRUCTURES USING TEMPLATED GRAIN NUCLEATION." U.S. Ser. No. 15/458,693 is a continuation of PCT/US2015/059162 filed on Nov. 5, 2015 and entitled "SYSTEMS AND METHODS FOR TAILORED MICROSTRUCTURES USING TEMPLATED GRAIN NUCLEATION." PCT/US2015/059162 claims priority from, and the benefit of, U.S. Provisional Application No. 62/077,983 filed on Nov. 11, 2014 and entitled "TAILORED MICROSTRUCTURES USING TEMPLATED GRAIN NUCLEATION." Each of the aforementioned applications is incorporated herein by reference in their entirety for all purposes.

TECHNICAL FIELD

The present disclosure relates to nanomaterials, and in particular to control of nanocrystalline microstructures resulting from the recrystallization of amorphous solids.

BACKGROUND

Nanocrystalline metals and alloys often have superior mechanical properties (e.g., high strength, wear resistance, superplastic formability, etc.) compared to coarse-grained materials. Nanocrystalline materials are primarily produced using two different approaches: (i) "top-down" approaches such as severe plastic deformation; or (ii) "bottom-up" approaches like sputtering or electrodeposition. A third, less common, technique to produce nanocrystalline alloys involves the recrystallization of a fully amorphous material by controlled thermal annealing or severe mechanical deformation. All of these prior approaches, however, provide only a limited capability to control the microstructure. Accordingly, improved techniques for creating nanocrystalline materials with controlled microstructures are desirable.

SUMMARY

In an exemplary embodiment, a method for controlled microstructure creation comprises depositing a first layer of amorphous material on a substrate, forming a series of seed crystals on the first layer of amorphous material, and annealing the amorphous material and the seed crystals to form the microstructure.

In another exemplary embodiment, a device comprises a TiAl layer having a crystalline microstructure. The average grain size of the microstructure is less than 200 nm. The microstructure was formed by depositing a first layer of amorphous TiAl material on a substrate, forming a series of seed crystals on the first layer of amorphous material, and annealing the amorphous material and the seed crystals.

In yet another exemplary embodiment, a device comprises a first layer of amorphous TiAl material, a first series of seed crystals disposed on the first layer, and a second layer of amorphous TiAl material disposed on the first layer and enclosing the first series of seed crystals between the first layer and the second layer.

The contents of this summary section are provided only as a simplified introduction to the disclosure, and are not intended to be used to limit the scope of the appended claims.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

Figure 1:
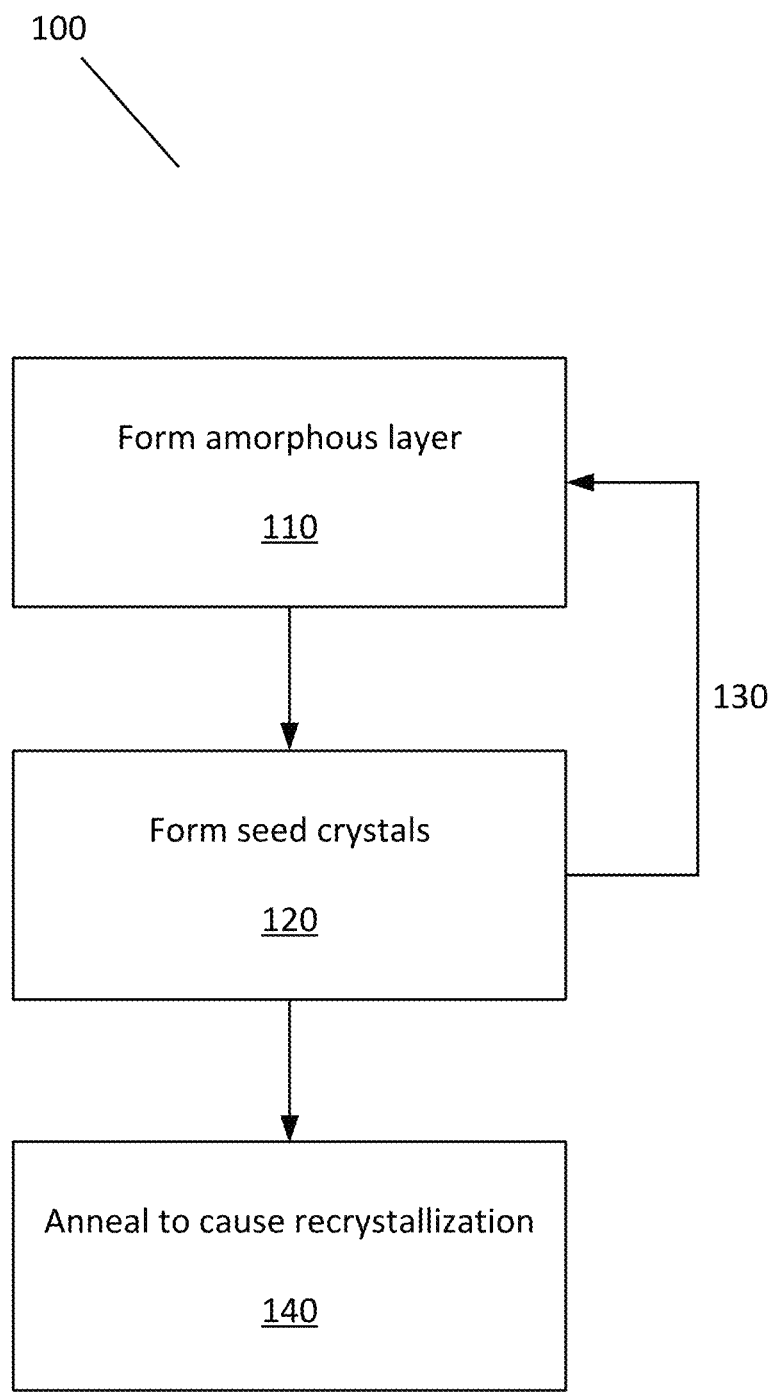
FIG. 1 illustrates a flow chart for a method for controlled microstructure creation in accordance with various exemplary embodiments.

The detailed description of exemplary embodiments herein makes reference to the accompanying drawings, which show exemplary embodiments by way of illustration. While these exemplary embodiments are described in sufficient detail to enable those skilled in the art to practice the principles of the present disclosure, it should be understood that other embodiments may be realized and that logical changes and adaptations in design and construction may be made in accordance with principles of the present disclosure. Thus, the detailed description herein is presented for purposes of illustration only and not of limitation. For example, steps recited in any of the method or process descriptions may be executed in any suitable order and are not necessarily limited to the order presented. Furthermore, any reference to singular includes plural embodiments, and any reference to more than one component or step may include a singular embodiment or step.

For the sake of brevity, conventional techniques for materials deposition, thermal processing, microstructure creation, crystalline engineering, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical method for controlled microstructure creation or in materials or devices resulting therefrom.

Nanocrystalline materials are primarily produced using two different approaches. "Top-down" approaches start with materials with larger crystals (grains) and then refine/break down the larger crystals (grains) down into nanoscaled materials (e.g., severe plastic deformation). "Bottom-up" approaches start with individual atoms/nanoparticles and then subsequently compact and/or assemble the atoms/nanoparticles into nanoscaled materials (e.g., sputtering or electrodeposition). A third, less common, technique to produce nanocrystalline alloys involves the recrystallization of a fully amorphous material by controlled thermal annealing or severe mechanical deformation.

All of these prior approaches, however, provide only a limited capability to control the microstructure. Depending on the use and/or purpose for the resulting nanocrystalline metal or alloy, it may be desirable to have greater control over the microstructure in order to change and control its properties. Accordingly, improved techniques for creating nanocrystalline materials with controlled microstructures are desirable.

These and other deficiencies of prior approaches of producing nanocrystalline materials may be addressed via application of principles of the present disclosure. In various exemplary embodiments, a microstructure may be engineered via the controlled recrystallization of amorphous alloys in connection with tuning the density and/or distribution of grain nucleation sites. The density and distribution may be controlled, for example, by systematically seeding nanocrystallites in an amorphous matrix in situ. Moreover, the cross-sectional microstructure and aspect ratio (height/diameter) of grains may be controlled, for example, by changing the number and distribution of crystalline seed layers.

Principles of the present disclosure enable creation of materials wherein the three-dimensional microstructure is controllable and/or tailorable to a desired set of parameters (e.g., grain size, material phase, etc.). Moreover, application of principles of the present disclosure may be directly applied to produce coatings having high strength, toughness, and oxidation/corrosion resistance, for example for uses in high-temperature structural applications. Additionally, methods disclosed herein may be extended to industrial scale processes, such as electrodeposition, enabling full three-dimensional microstructural control of bulk nanocrystalline alloys.

Utilization of principles of the present disclosure can enable significant improvements in the mechanical, thermal, and chemical properties of various materials. Additionally, the performance and operational lifetime of various industrial and/or military components may be enhanced. For example, microstructured and/or nanostructured materials as contemplated herein may be utilized to prevent oxidation and/or corrosion of high-temperature structural alloys used in aircraft engine compressor blades and casings, automobile turbochargers, steam turbine blades, power plant boiler tubing, and/or the like. Additionally, fabrication techniques disclosed herein may be applied to form low-pressure turbine blades and other plate-like structures.

With reference now to FIG. 1, in various exemplary embodiments, principles of the present disclosure contemplate a method 100 for controlled microstructure creation. In an exemplary embodiment, method 100 for controlled microstructure creation comprises depositing a first layer of amorphous material on a substrate (step 110), depositing a series of seed crystals on the first layer (step 120), repeating the first two steps to form a multi-layered structure as desired (step(s) 130), and annealing the combined structure to cause recrystallization (step 140). Via use of method 100, microstructures having desired properties (e.g., grain height, grain orientation, grain diameter, material phase, and/or the like) may be formulated.

Figure 2:
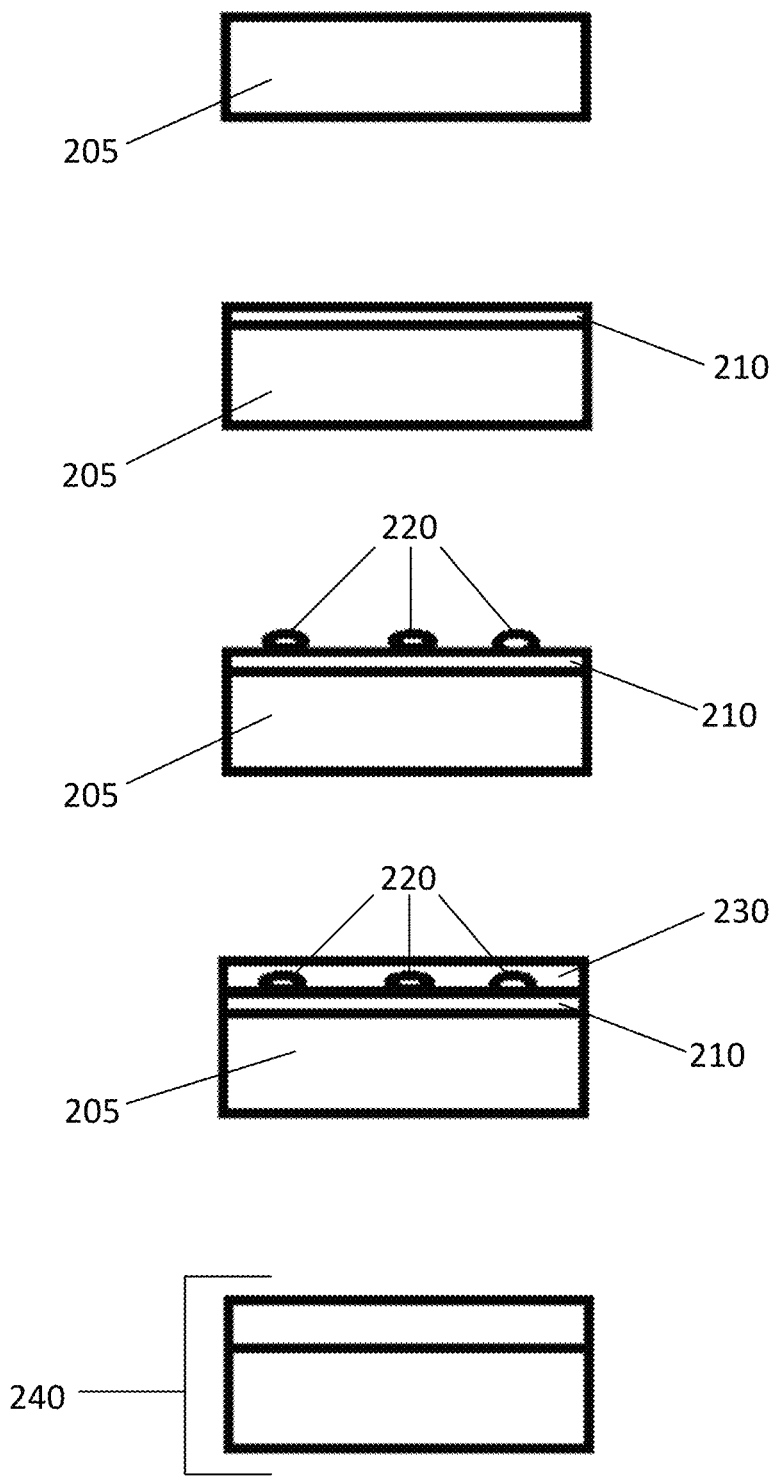
FIG. 2 illustrates a method for controlled microstructure creation in accordance with various exemplary embodiments.

With reference now to FIG. 2, in various exemplary embodiments a method for controlled microstructure creation comprises depositing a first layer 210 of amorphous material on a substrate 205. First layer 210 of amorphous material may comprise any suitable amorphous material, for example titanium aluminide (TiAl), zirconium aluminide ($Zr_3Al$), iron aluminide (FeAl), nitinol (NiTi), zirconium copper ($Zr_xCu_{1-x}$), terbium iron (TbFe), iron zirconium (FeZr), tantalum zirconium (TaZr), and/or the like, or any other suitable amorphous material. Substrate 205 may be any suitable type of substrate, such as a silicon substrate. First layer 210 may be deposited on a substrate 205 using any suitable method, technique, and/or components.

In various exemplary embodiments, first layer 210 may be formed by co-sputtering the constitutive elements of the alloy, for example at a temperature around room temperature. First layer 210 may also be formed via deposition at a reduced temperature, in order to ensure an amorphous result. First layer 210 may have any suitable thickness. In various exemplary embodiments, first layer 210 is configured with a thickness of between about 20 nm and about 500 nm.

In various exemplary embodiments, a series of seed crystals 220 may be deposited on first layer 210. Each seed crystal 220 may act as a nucleation site for a grain or grains in the amorphous film during heat treatment 240. It will be appreciated that seeded films typically crystallize faster than unseeded films and have a smaller grain size. Accordingly, when the number of nucleation sites is greater with the use of seed crystals 220, a larger number of grains nucleate and, as the growing grains impinge upon one another, their further growth is restricted. This growth restriction leads to a smaller nanocrystalline grain size. Moreover, in various exemplary embodiments, films with a seed layer retain their nanocrystalline grain structure, even at elevated temperatures up to 973 Kelvin.

In contrast, unseeded films do not have as many nucleation sites and large single crystal islands start to form upon heat treatment. These single crystal islands typically coalesce and form micron-sized grains having large lamellar structure. Accordingly, grains in films with no seed layer enter the micro-crystalline regime after heat treatment.

Turning now to FIGS. 3A-3E, and in accordance with various exemplary embodiments, certain differences and benefits between un-seeded amorphous layers and seeded amorphous layers are further illustrated and discussed.

Figure 3A:
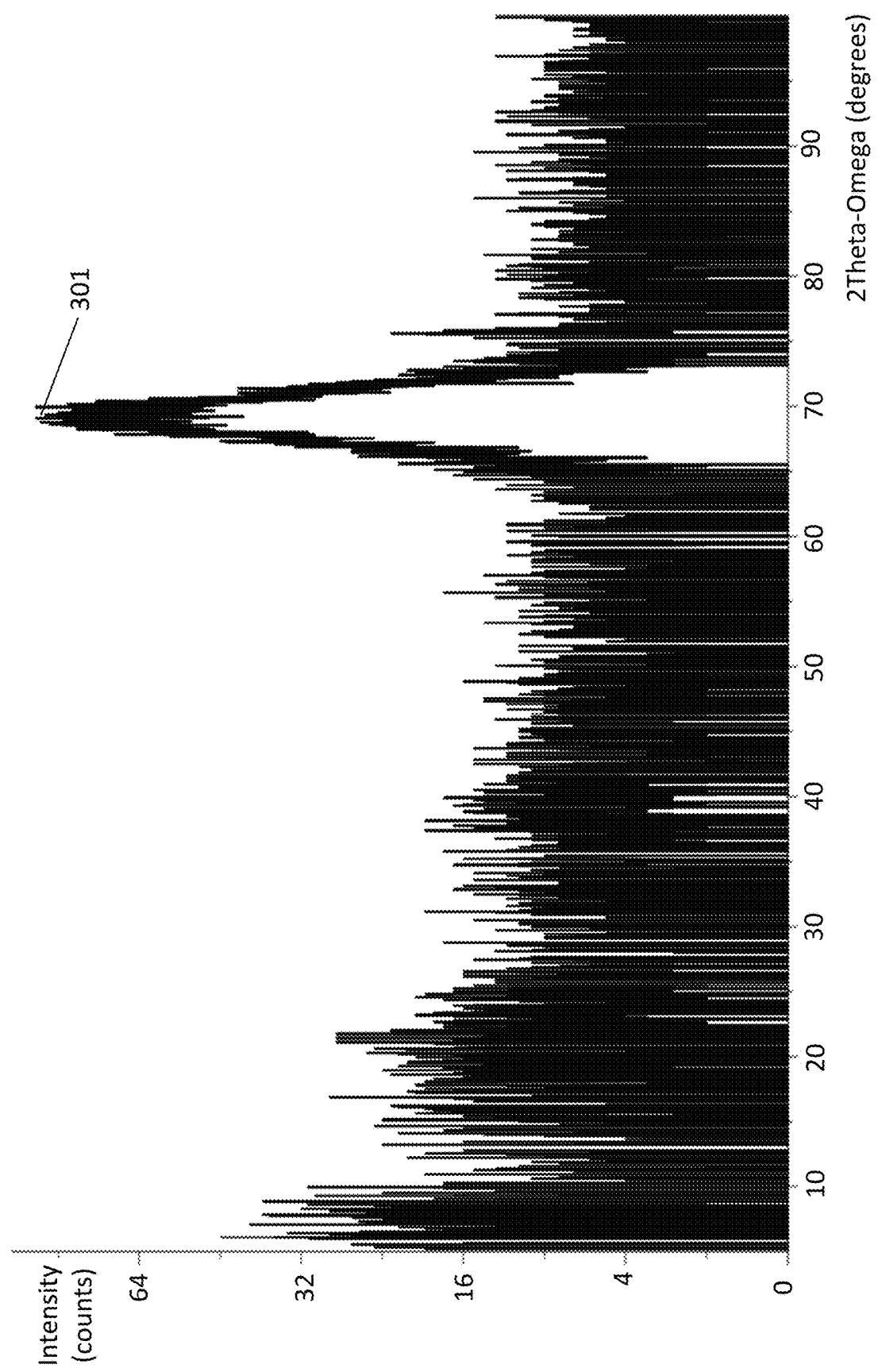
FIG. 3A illustrates x-ray diffraction results for unseeded 50Ti-50Al material on a silicon substrate, after exposure to 4 hours of heat treatment at 550° C.

FIG. 3A illustrates an x-ray diffraction scan of an unseeded 50Ti-50Al sample on a silicon substrate, after 4 hours of heat treatment at 550° C. Without the presence of added seed crystals, the only peak on the x-ray diffraction scan is the peak 301 arising from the silicon substrate. No other peaks are visible.

Figure 3B:
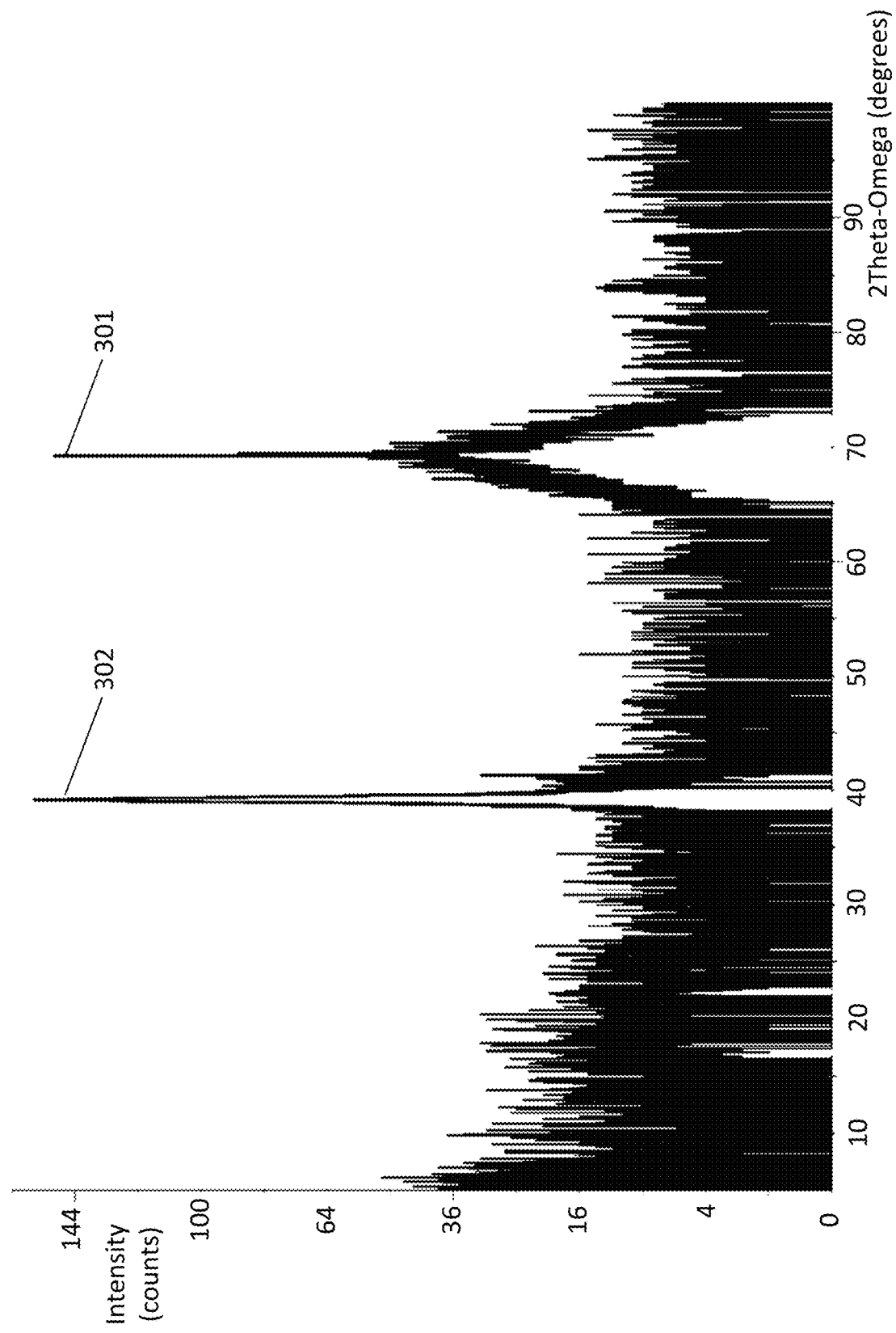
FIG. 3B illustrates x-ray diffraction results for 50Ti-50Al material on a silicon substrate and seeded with 1.0 nm Ti crystals, after exposure to 4 hours of heat treatment at 550° C., in accordance with various exemplary embodiments.

In contrast, FIG. 3B illustrates an x-ray diffraction scan of a 50Ti-50Al sample on a silicon substrate and configured with 1.0 nm Ti seed crystals, after 4 hours of heat treatment at 550° C. Peak 301 arising from the silicon substrate is now joined by a peak 302 arising from the presence of crystalline TiAl.

Figure 3C:
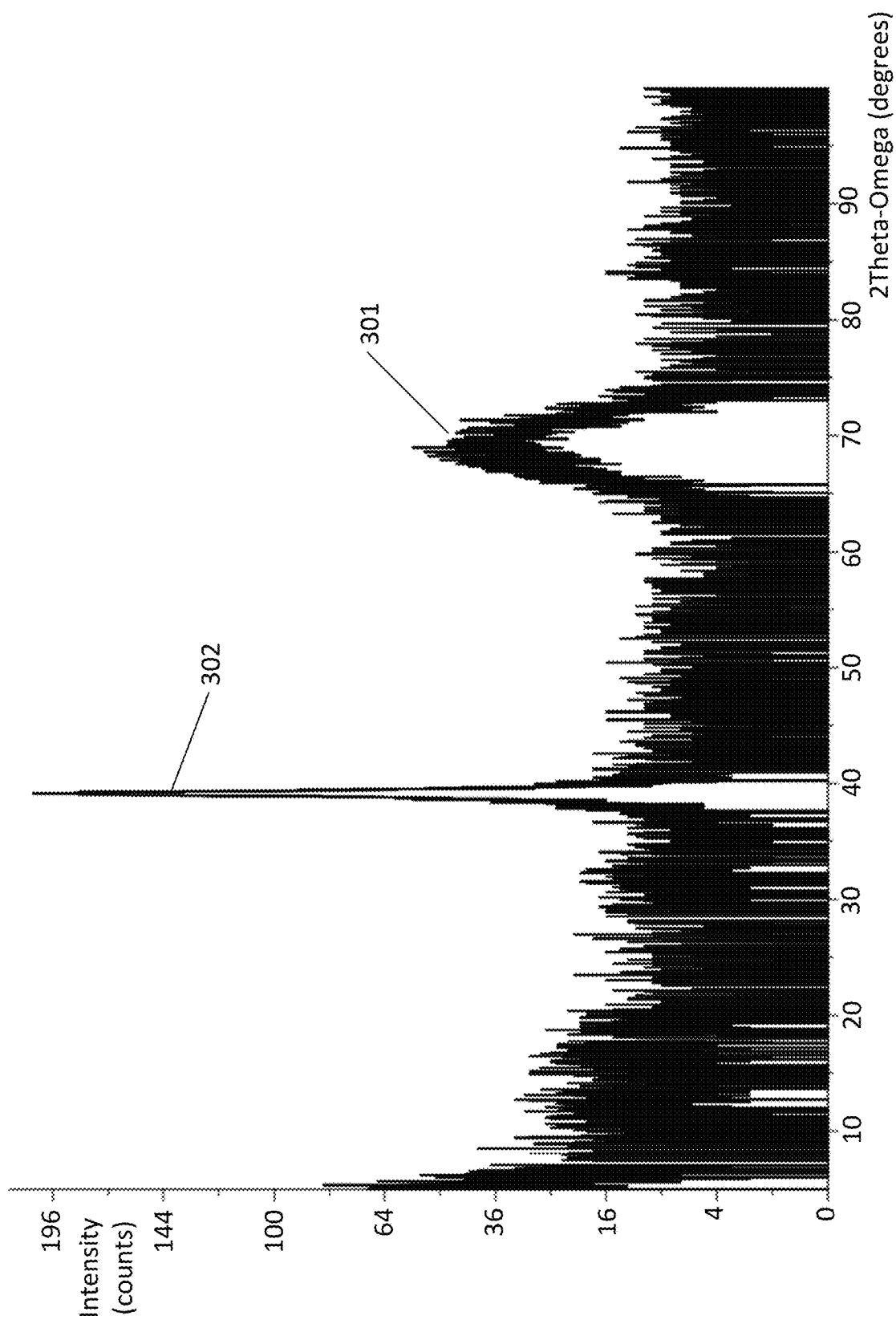
FIG. 3C illustrates x-ray diffraction results for 50Ti-50Al material on a silicon substrate and seeded with 2.5 nm Ti crystals, after exposure to 4 hours of heat treatment at 550° C., in accordance with various exemplary embodiments.

FIG. 3C illustrates an x-ray diffraction scan of a 50Ti-50Al sample on a silicon substrate and configured with 2.5 nm Ti seed crystals, after 4 hours of heat treatment at 550° C. Peak 301 arising from the silicon substrate is now joined by a peak 302 arising from the presence of crystalline TiAl. Note that the intensity of the TiAl peak 302 is greater in this sample with the use of 2.5 nm Ti seed crystals, than that of the previous sample of 1.0 nm Ti seed crystals (as shown in FIG. 3B). This greater intensity of the TiAl peak 302 indicates a greater extent of crystallization in the sample using 2.5 nm Ti seed crystals.

Figure 3D:
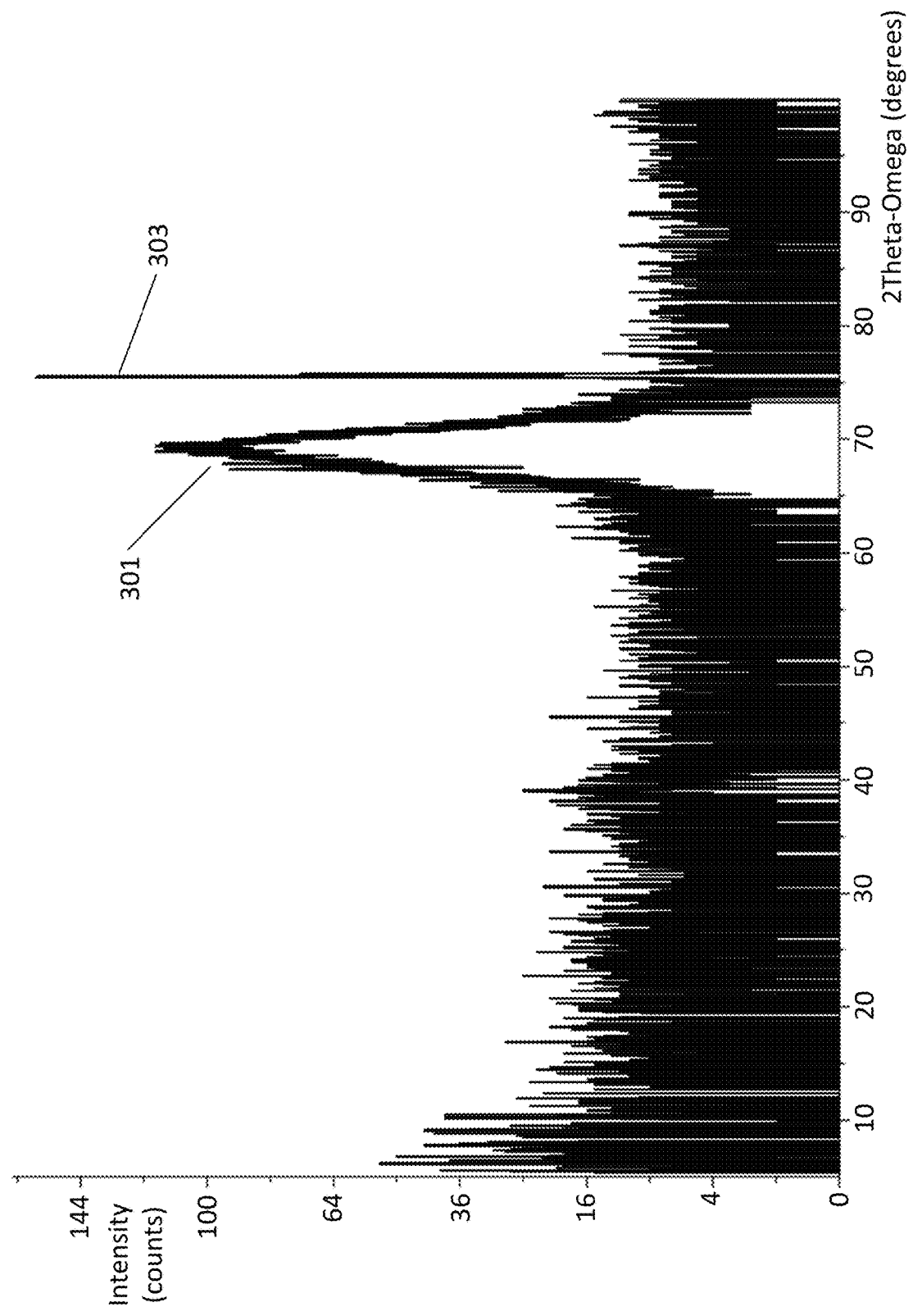
FIG. 3D illustrates x-ray diffraction results for 50Ti-50Al material on a silicon substrate and seeded with 1.0 nm Al crystals, after exposure to 4 hours of heat treatment at 550° C., in accordance with various exemplary embodiments.

FIG. 3D illustrates an x-ray diffraction scan of a 50Ti-50Al sample on a silicon substrate and configured with 1.0 nm Al seed crystals, after 4 hours of heat treatment at 550° C. Peak 301 arising from the silicon substrate is joined by a peak 303 arising from the presence of $TiAl_3$. Note that a peak arising from the presence of TiAl is absent from this sample, compared to the samples prepared with Ti seed crystals (e.g., as shown in FIGS. 3B and 3C), indicating that the material used for the seed crystal also has an effect on the resulting crystallization.

Figure 3E:
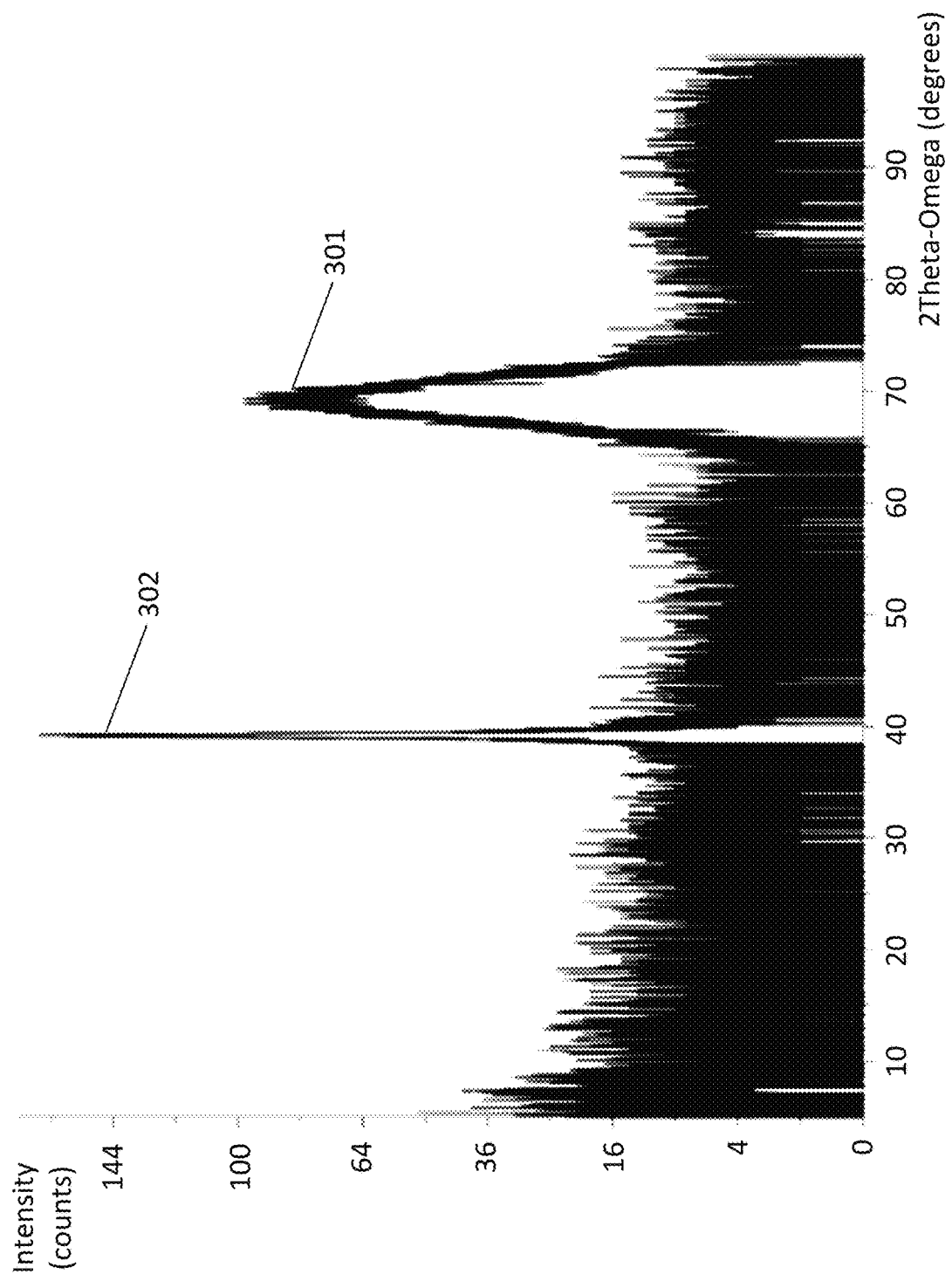
FIG. 3E illustrates x-ray diffraction results for 45Ti-55Al material on a silicon substrate and seeded with 1.0 nm Ti crystals, after exposure to 4 hours of heat treatment at 550° C., in accordance with various exemplary embodiments.

FIG. 3E illustrates an x-ray diffraction scan of a 45Ti-55Al sample on a silicon substrate and configured with 1.0 nm Ti seed crystals, after 4 hours of heat treatment at 550° C. Peak 301 arising from the silicon substrate is joined by a peak 302 arising from the presence of crystalline TiAl. As this pattern is similar to the pattern obtained in 50Ti-50Al samples (e.g., as shown in FIG. 3B), this is indicative that the seed crystals locally alter the composition of the thin films and cause crystallization of specific species.

In various exemplary embodiments, a series of seed crystals may be formed on a first layer through any suitable method and/or means. In this regard, the series of seed crystals may be formed by depositing a thin layer of crystalline seed material on the amorphous layer, depositing a thin layer of an alloy (for example, TiAl) on the amorphous layer while the substrate temperature is temporarily increased, placing a mask with patterned holes atop the amorphous layer during seed crystal deposition, and/or through any other suitable method and/or technique.

In various exemplary embodiments, and returning now to FIG. 2, a series of seed crystals 220 may be created by depositing a thin layer of crystalline seed material on an amorphous layer 210. It may be desirable to deposit the crystalline seed material in a layer that is less than 10 nm thick, because if the layer of crystalline seed material is sufficiently thin, the layer of crystalline seed material will be non-contiguous and will result in the formation of crystalline islands (e.g., "seeds" or "seed crystals"). In various exemplary embodiments, when amorphous layer 210 comprises TiAl, seed crystals 220 may comprise crystalline Ti and/or crystalline Al. In various exemplary embodiments, seed crystals 220 may be configured with a diameter of between about 0.5 nm and about 10 nm.

The size and spacing of seed crystals 220 may be controlled by varying different factors. For example, the size and spacing of seed crystals 220 may be controlled by varying the deposition temperature, the deposition rate, and/or by delaying the deposition of any subsequent amorphous layer(s) 230. A high deposition rate (for example, a deposition rate of between about 50 nm/min and about 5 μm/min) and a low deposition temperature (for example, a deposition temperature between about 77 Kelvin (K) and about 273 K) may lead to a high nucleation rate and, therefore, to a small distance between seed crystals 220. This small distance between seed crystals 220 may typically be less than 5 nm.

In contrast, a low deposition rate (for example, a deposition rate between about 0.5 nm/min and about 5 nm/min) and a high deposition temperature (for example, a deposition temperature between about 573 K and about 1473 K) will result in a lower nucleation rate and, therefore, a larger distance between seed crystals 220. This larger distance between seed crystals 220 may typically be greater than 10 nm. In addition, by delaying the deposition of any subsequent amorphous layer(s) 230, seed crystals 220 may be allowed to coalesce and coarsen into single crystals, further increasing the spacing between seed crystals 220.

In various exemplary embodiments, a series of seed crystals 220 may be created by depositing a thin layer of an alloy (for example, TiAl) on amorphous layer 210 while the temperature of the substrate 205 is temporarily increased, for example to a temperature of between about 373 K and about 673 K. Under these circumstances, the incoming atoms on the surface will have high mobility and will crystallize into seeds. It will be appreciated that the temperature increase of substrate 205 should be insufficient to cause recrystallization in the thicker, bulk material in amorphous layer 210.

Figure 4:
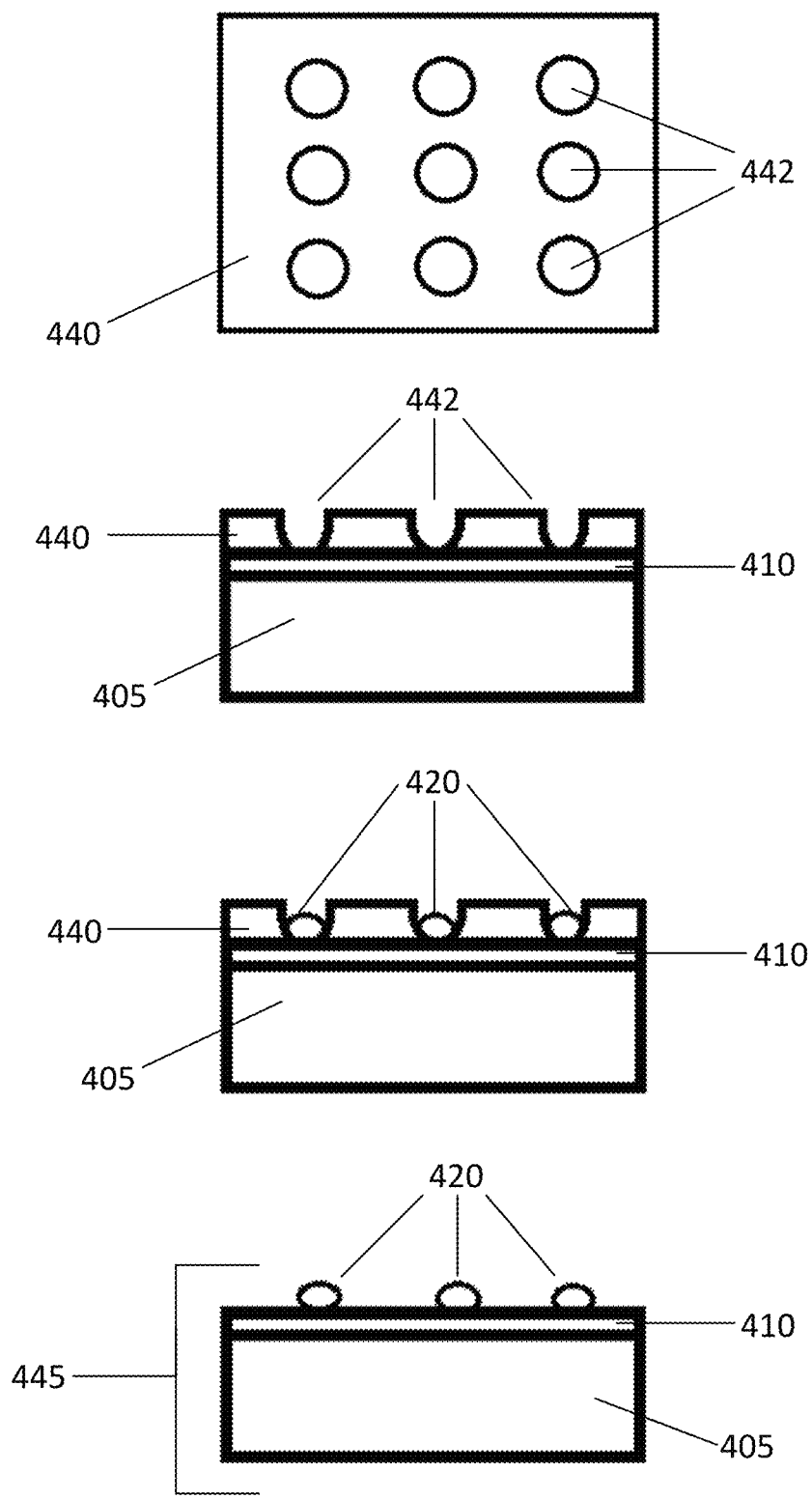
FIG. 4 illustrates a method for forming seed crystals using a mask, in accordance with various exemplary embodiments.

With reference now to FIG. 4, in various exemplary embodiments a series of seed crystals 420 may be created by placing a mask 440 configured with patterned holes 442 atop an amorphous layer 410 prior to and/or during seed crystal deposition. This may ensure that seed crystals 420 are deposited onto amorphous layer 410 only at the patterned hole 442 locations. A variety of mask patterns for patterned holes 442 may be utilized in order to achieve a desired size, shape, and distribution of seed crystals 420. For example, patterned holes 442 may be arranged into grids, lines, staggered rows, and/or the like.

In various exemplary embodiments, mask 440 may first be placed onto amorphous layer 410. Seed crystals 420 then may be formed at least partially in patterned holes 442 of mask 440. After seed crystals 420 are in a desired position and/or state of growth, mask 440 may then be removed, leaving only substrate 405, amorphous layer 410, and seed crystals 420 in the desired locations (i.e., as illustrated as combined structure 445 in FIG. 4). For example, mask 440 may be fabricated from a silicon wafer by etching holes in the wafer at specified locations. In another example, mask 440 may comprise a thin layer (for example, having a thickness of between about 20 nm and about 50 nm) of $Si_3N_4$ or $SiO_2$ grown atop amorphous layer 410 and etched at the locations corresponding to seed crystals 420, and the $Si_3N_4$ or $SiO_2$ layer may be removed after the deposition of seed crystals.

Figure 5:
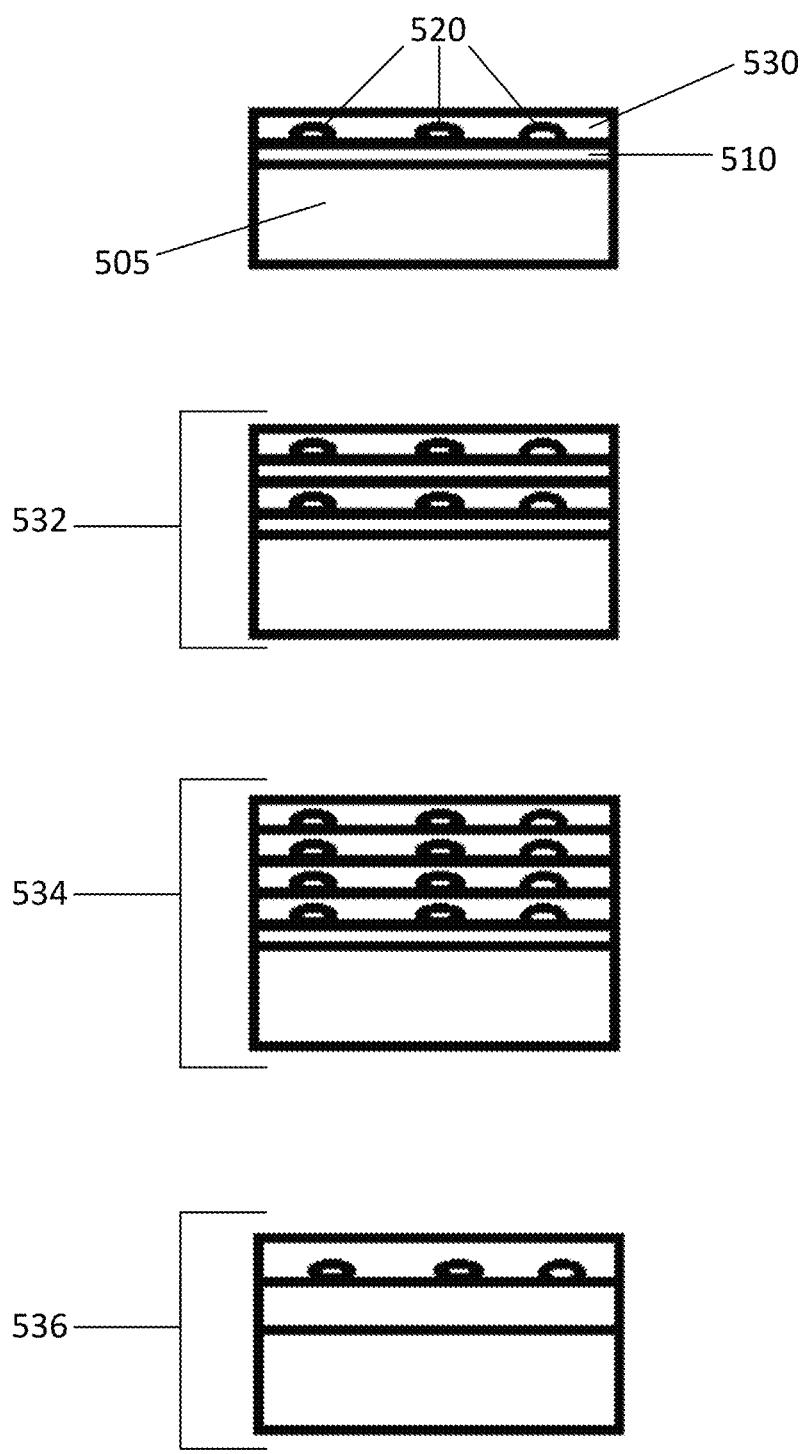
FIG. 5 illustrates multi-layered nanocrystalline structures, in accordance with various exemplary embodiments.

With reference now to FIG. 5, in various exemplary embodiments, the steps of depositing a first layer 510 of amorphous material onto a substrate 505 and depositing a series of seed crystals 520 on first layer 510 may be repeated, as desired, in order to form a multi-layered structure having desired characteristics. The cross-sectional microstructure and aspect ratio (length/diameter) of grains may be controlled, for example by changing the configuration of seed crystals 520 (for example, seed size, seed spacing, seed material, number of layers having seed crystals therein, etc.). The configuration of seed crystals 520 may vary from layer to layer, for example, in order to achieve a desired thermal, electrical, photonic, and/or mechanical property of the overall multi-layer structure.

In various exemplary embodiments, a multi-layered structure of amorphous material and seed crystals may have any suitable overall thickness. In some exemplary embodiments, the overall thickness may be between about 100 nm and about 100,000 nm. Moreover, the thickness of layers of amorphous material having seed crystals deposited thereon and/or therein may be varied. For example, a first layer of amorphous material may be configured to have a thickness of 50 nm, a second, subsequent layer 530 of amorphous material may be configured to have a thickness of 200 nm, and a third, subsequent layer of amorphous material may be configured to have a thickness of 100 nm. Furthermore, the grain height and the grain diameter may be varied in order to achieve a desired grain structure and/or phase in the post-annealed material.

As an example, a multi-layered structure 532 may be formed having two seed layers of about 200 nm thickness, with seed spacing of about 100 nm. As a further example, a multi-layered structure 534 may be formed having four seed layers of about 200 nm thickness, with seed spacing of about 50 nm. Moreover, a multi-layered structure 536 may be formed having a single seed layer of about 200 nm thickness. It should be understood that the above are mentioned for example purposes only, and that exemplary multi-layered structures configured in accordance with principles of the present disclosure may be formed to have any desired thickness, seed spacing, and/or seed layer distribution. The seed spacing and configuration in each of the seed layers can be varied, for example, by using a different mask 440 for each seed layer deposition. This allows for independent control of grain diameter in each layer. Additionally, the thickness of the amorphous layer(s) can be varied from layer to layer in order to control the grain height. In this manner, complete three-dimensional control (including grain diameter and aspect ratio) of the microstructure can be achieved. In various exemplary embodiments, a multi-layered structure 532 is configured to create a film having a gradient microstructure—for example, small grains near the surface and progressively larger grains through the thickness—in order to achieve materials having high strength, ductility, and enhanced wear resistance.

In various exemplary embodiments, and with renewed reference to FIG. 1, once the desired seed crystals and/or additional layers are in place, the combined structure may be annealed (e.g., heat treated) to cause recrystallization (step 140). The annealing may be conducted at any suitable temperature. In various exemplary embodiments, the annealing is conducted at a temperature between about 573 K and about 1473 K. The annealing may also be conducted for any suitable period of time. For example, the annealing may take place over a period of between about 1 hour and about 100 hours. The annealing may also be conducted in any suitable environment. However, in various exemplary embodiments the annealing is conducted in a high vacuum furnace ($<10^{-6}$ torr).

The size of the nucleating grains when they impinge on each other during recrystallization can be controlled by various factors, for example the size of the seed(s), seed spacing, the nature of the seed crystals (e.g., the crystal structure of the seed), the composition (e.g., element ratios) of the amorphous material, and/or other like factors. Moreover, the final size and/or shape of the grains may be influenced and/or controlled by the annealing temperature. In various exemplary embodiments, grains may continue to grow after impingement, particularly if the annealing is done at a sufficiently high temperature.

In various exemplary embodiments, the nature of the seed crystals utilized has an effect on the resulting phases in the post-annealed material. For example, use of Al seed crystals on a TiAl amorphous layer tends to produce $TiAl_3$ (for example, as illustrated in FIG. 3D). The size of the seed also effects the crystallization during annealing. For example, and with reference again to FIGS. 3B and 3C, the extent of crystallization when a 2.5 nm seed is utilized is greater than when a 1.0 nm seed is utilized. Notably, if similar seed crystals are utilized, similar phases tend to appear after annealing, even when the composition of the amorphous material is varied. Therefore, the seed crystals act locally to alter the chemistry and crystallization kinetics.

Turning now to FIGS. 6-14, and in accordance with various exemplary embodiments, the differences and benefits between unseeded amorphous layers, seeded amorphous layers, and multi-layered structures during the annealing process are further illustrated.

Figure 6:
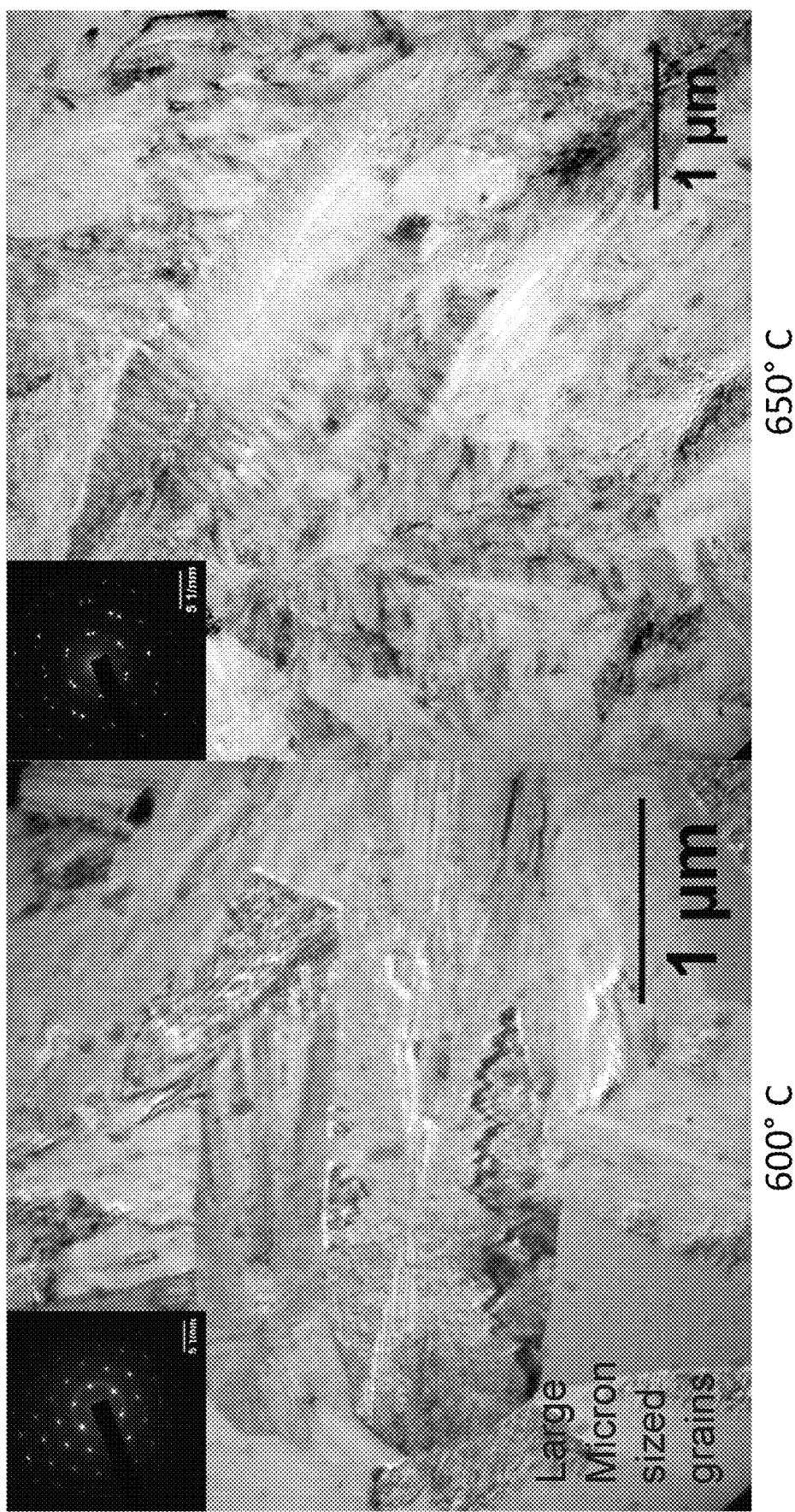
FIG. 6 illustrates transmission electron microscopy (TEM) images of unseeded 45Ti-55Al material after exposure to 4 hours of heat treatment at 600° C. and 650° C.
Figure 7:
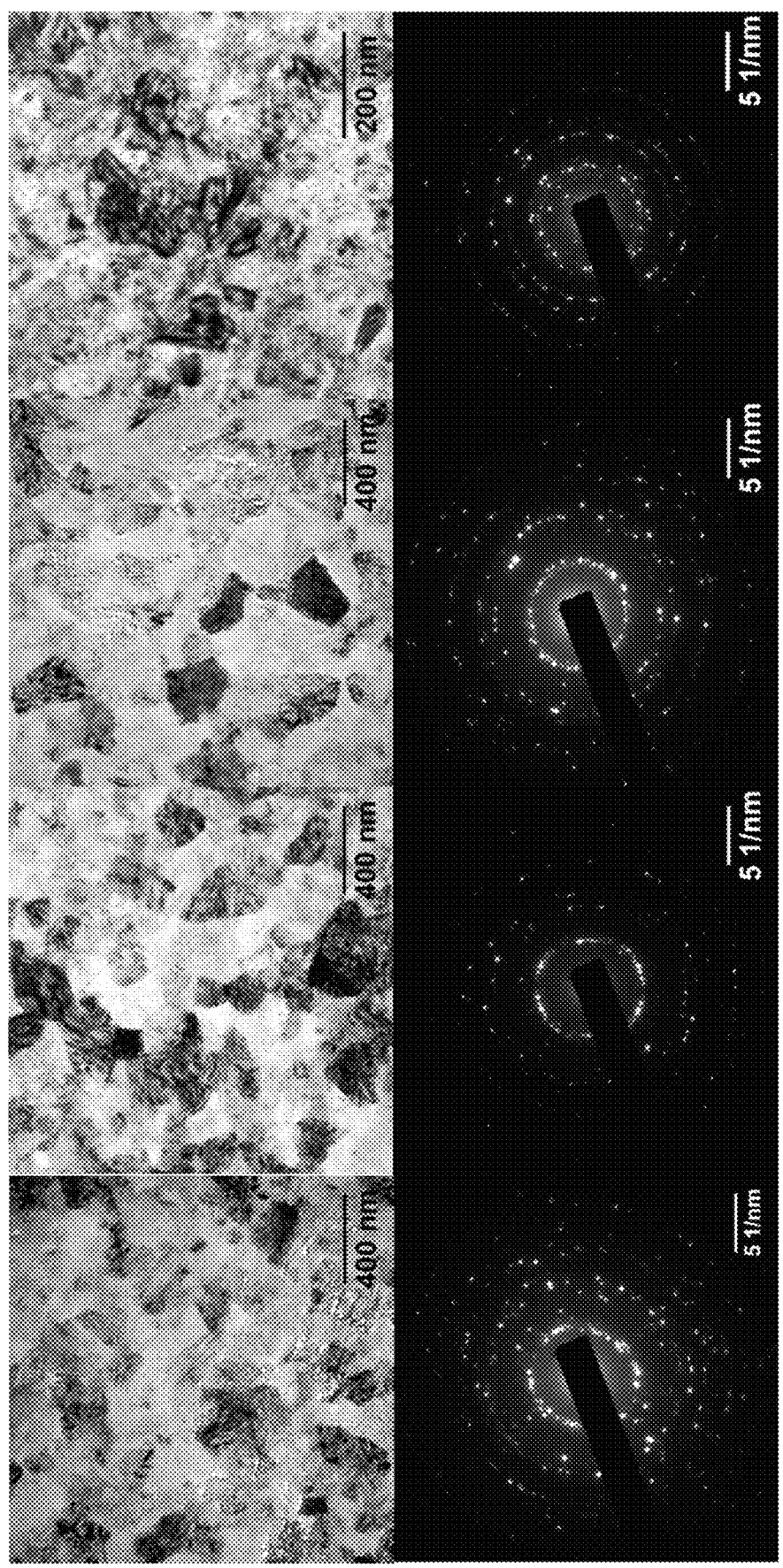
FIG. 7 illustrates TEM images and x-ray diffraction images of 45Ti-55Al material seeded with 1.0 nm Ti crystals, after exposure to 4 hours of heat treatment at various temperatures, in accordance with various exemplary embodiments.

With reference to FIG. 6, an unseeded material after 4 hours of heat treatment at 600° C. and 650° C. is depicted. In these TEM images, large micron-sized grains can be seen. In comparison, and with reference to FIG. 7, a material that is seeded with 1.0 nm Ti seed crystals, produces ultrafine and nanocrystalline grains after 4 hours of annealing at 550° C., 600° C., 650° C., and 700° C., respectively.

Figure 8:
FIG. 8 illustrates TEM images of unseeded 45Ti-55Al, after exposure to heat treatment of 650° C. for various amounts of time.
Figure 9:
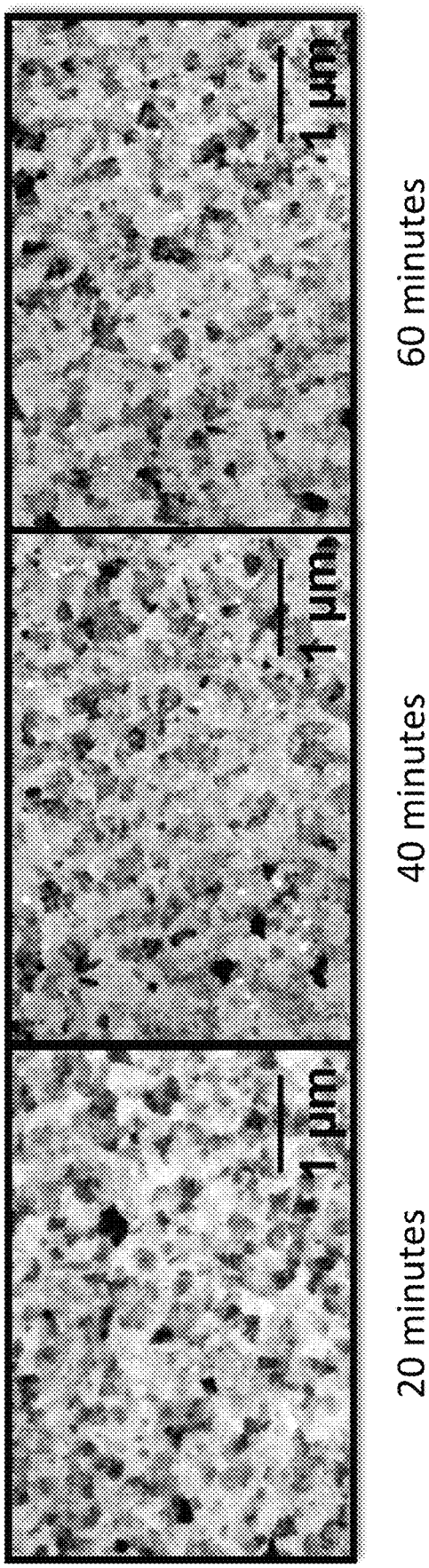
FIG. 9 illustrates TEM images of 45Ti-55Al seeded with 1.0 nm Ti crystals, after exposure to heat treatment of 650° C. for various amounts of time, in accordance with various exemplary embodiments.

With reference to FIG. 8, TEM images of an unseeded material are shown after 20 minutes, 40 minutes, and 60 minutes of annealing at 650° C. Large micron-sized grains can again be seen. In comparison, and with reference to FIG.

9, TEM images of a seeded material are shown after 20 minutes, 40 minutes, and 60 minutes of annealing at 650° C., displaying ultrafine and nanocrystalline grain sizes.

Figure 10:
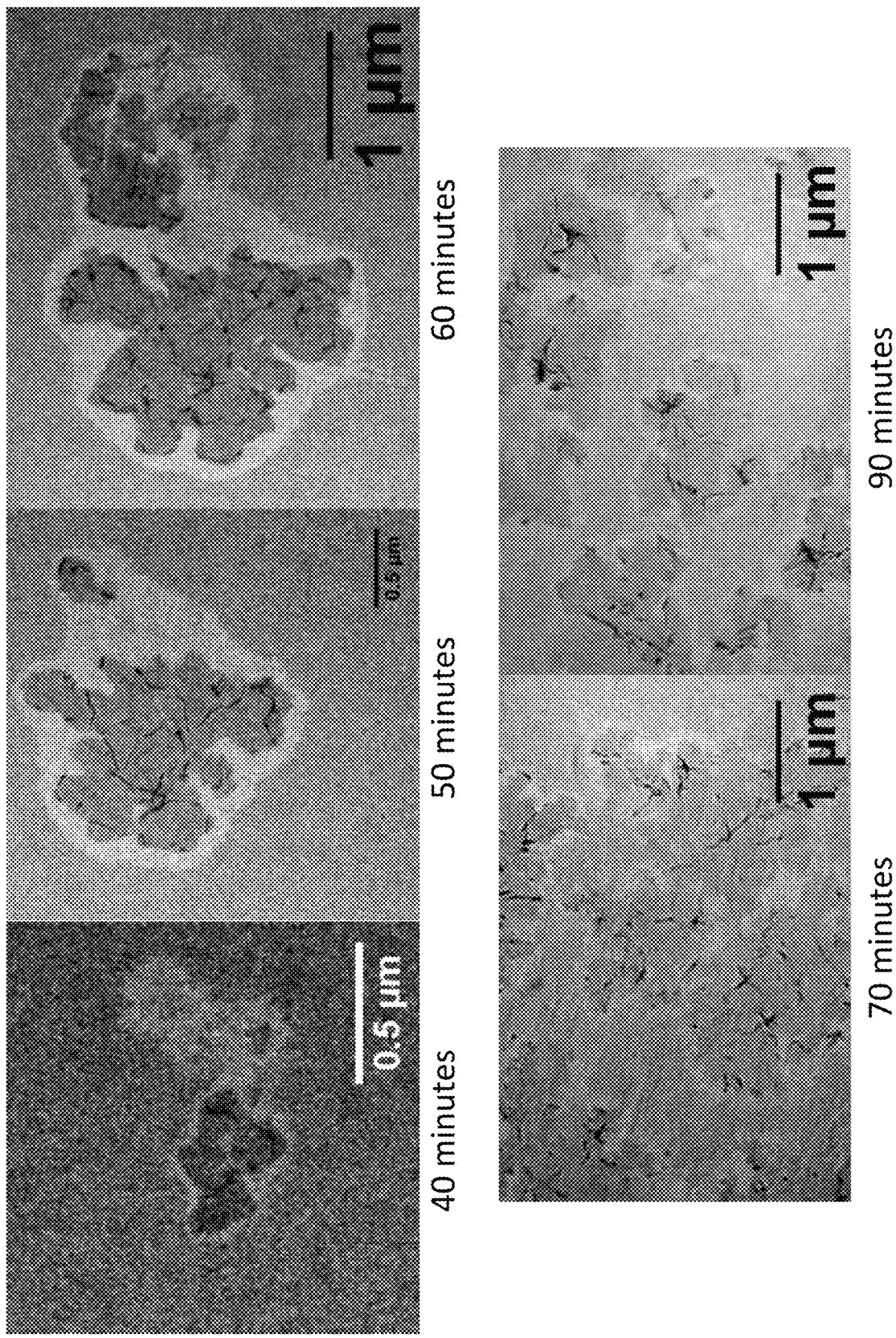
FIG. 10 illustrates limited seed island growth in an unseeded 45Ti-55Al material after exposure to heat treatment of 650° C. for various amounts of time, in accordance with various exemplary embodiments.
Figure 11:
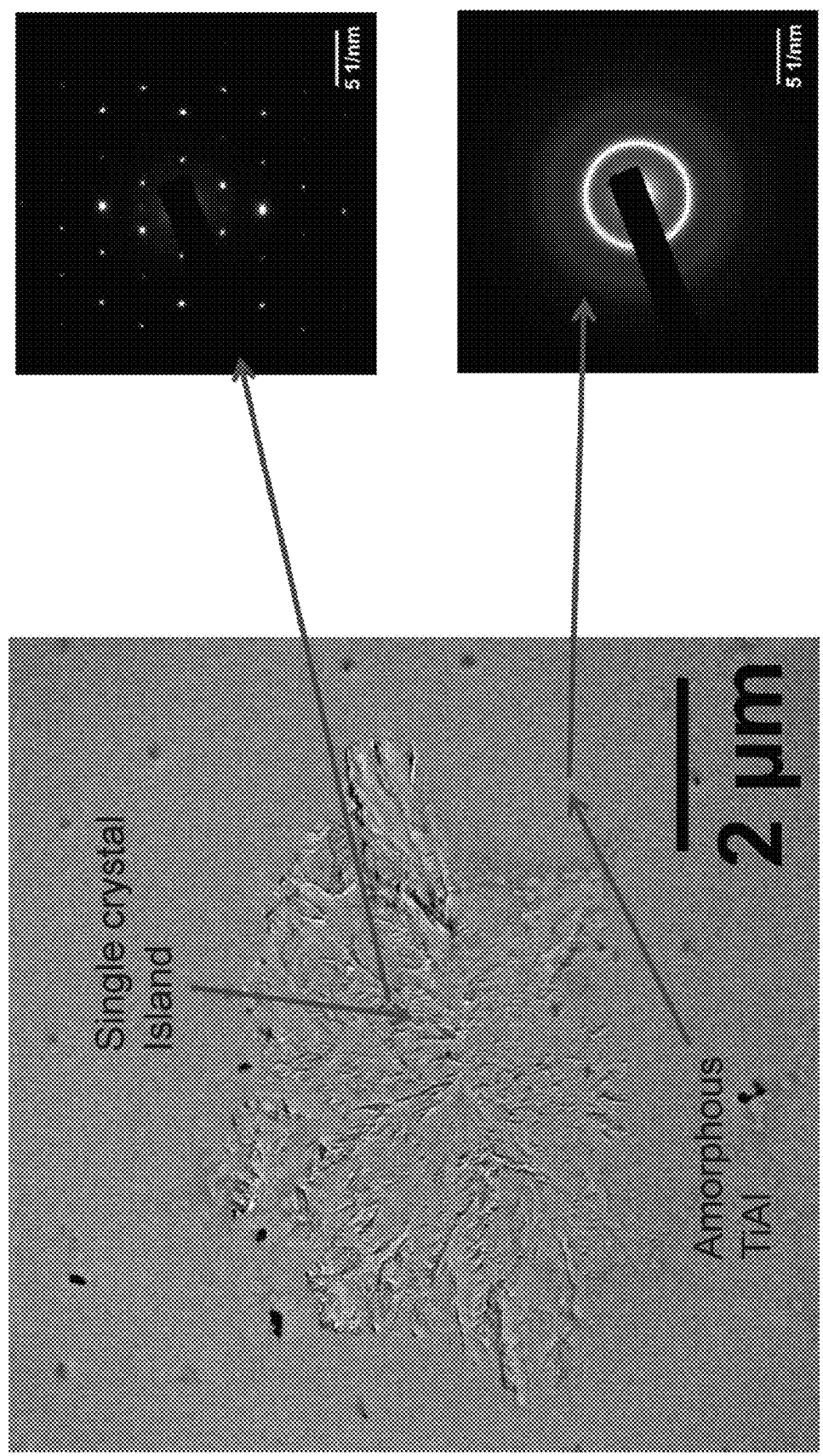
FIG. 11 illustrates TEM images and selected area electron diffraction patterns of a single crystal island in an unseeded 45Ti-55Al film.

With reference to FIGS. 10 and 11, TEM images depicting the progress of crystallization in unseeded TiAl films are shown. Nucleation, growth, and coalescence of large single crystal islands in the amorphous matrix are observed. These islands subsequently lead to the formation of the large micron-sized grains seen in FIGS. 6 and 8.

Figure 12A:
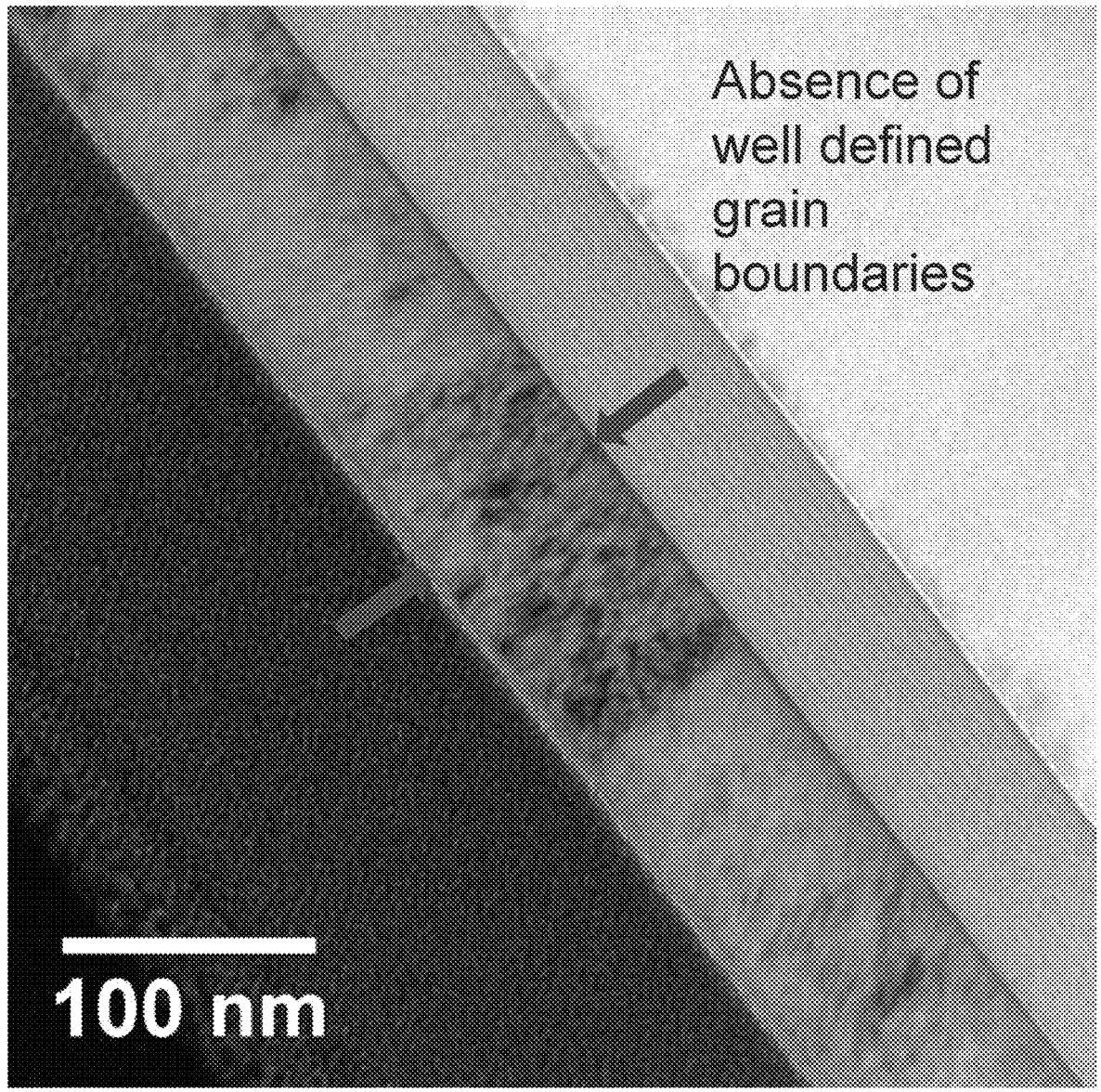
FIG. 12A illustrates a cross-sectional TEM image of unseeded 45Ti-55Al material after annealing.
Figure 12B:
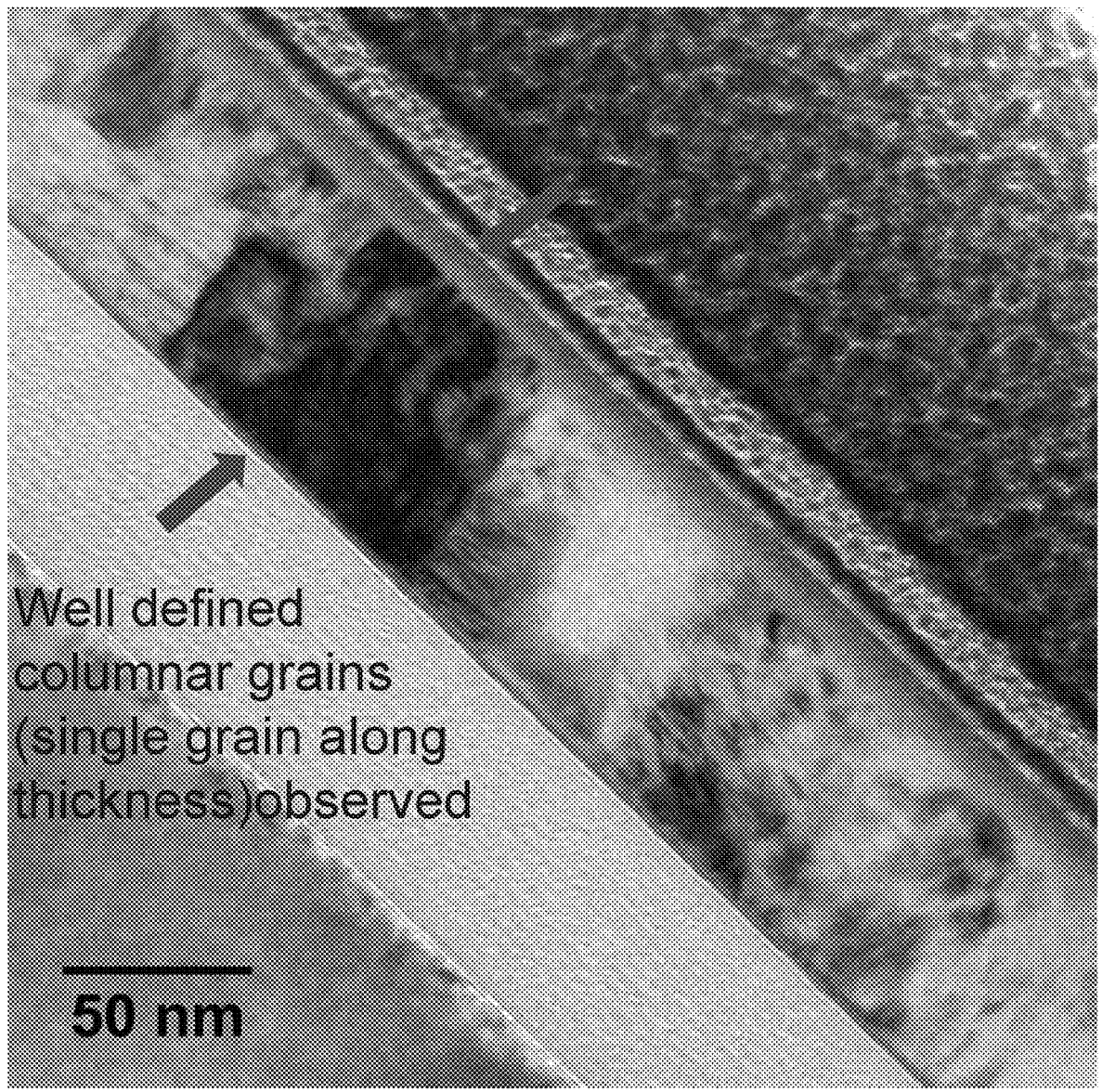
FIG. 12B illustrates a cross-sectional TEM image of 45Ti-55Al material seeded with 1.0 nm Ti crystals and then annealed, in accordance with various exemplary embodiments.

With reference now to FIG. 12A, a cross-sectional TEM image of unseeded annealed 45Ti-55Al material is shown. The cross-sectional view of the unseeded material shows a resulting microstructure having an absence of well-defined grain boundaries. In comparison, with reference to FIG. 12B, a cross-sectional TEM image of an exemplary 45Ti-55Al material seeded with 1.0 nm Ti seed crystals and then annealed shows a resulting microstructure having well-defined columnar grains.

Figure 13A:
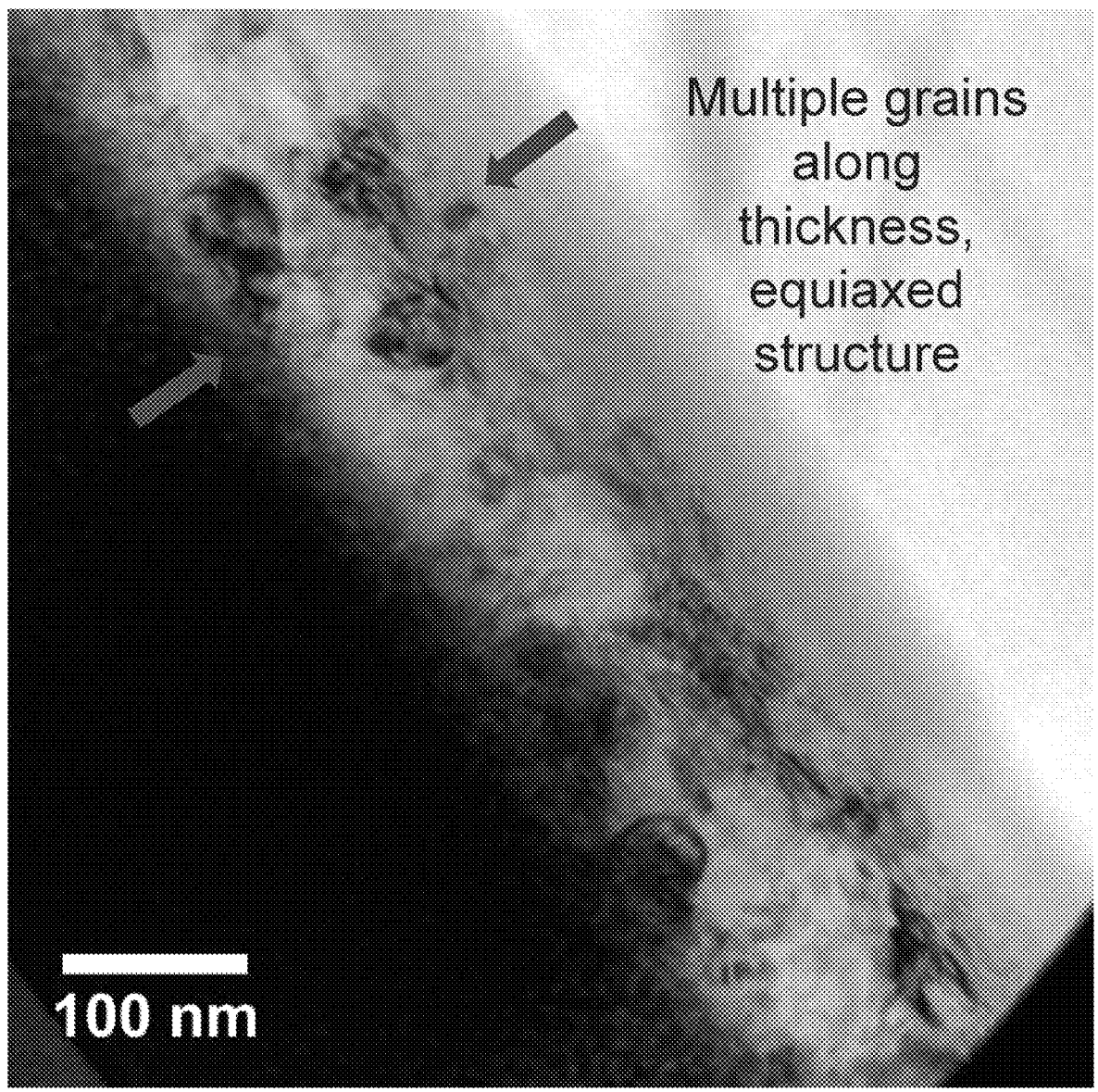
FIG. 13A illustrates a cross-sectional TEM image of 45Ti-55Al material seeded with two seed layers of 1.0 nm Ti crystals and then annealed, in accordance with various exemplary embodiments.
Figure 13B:
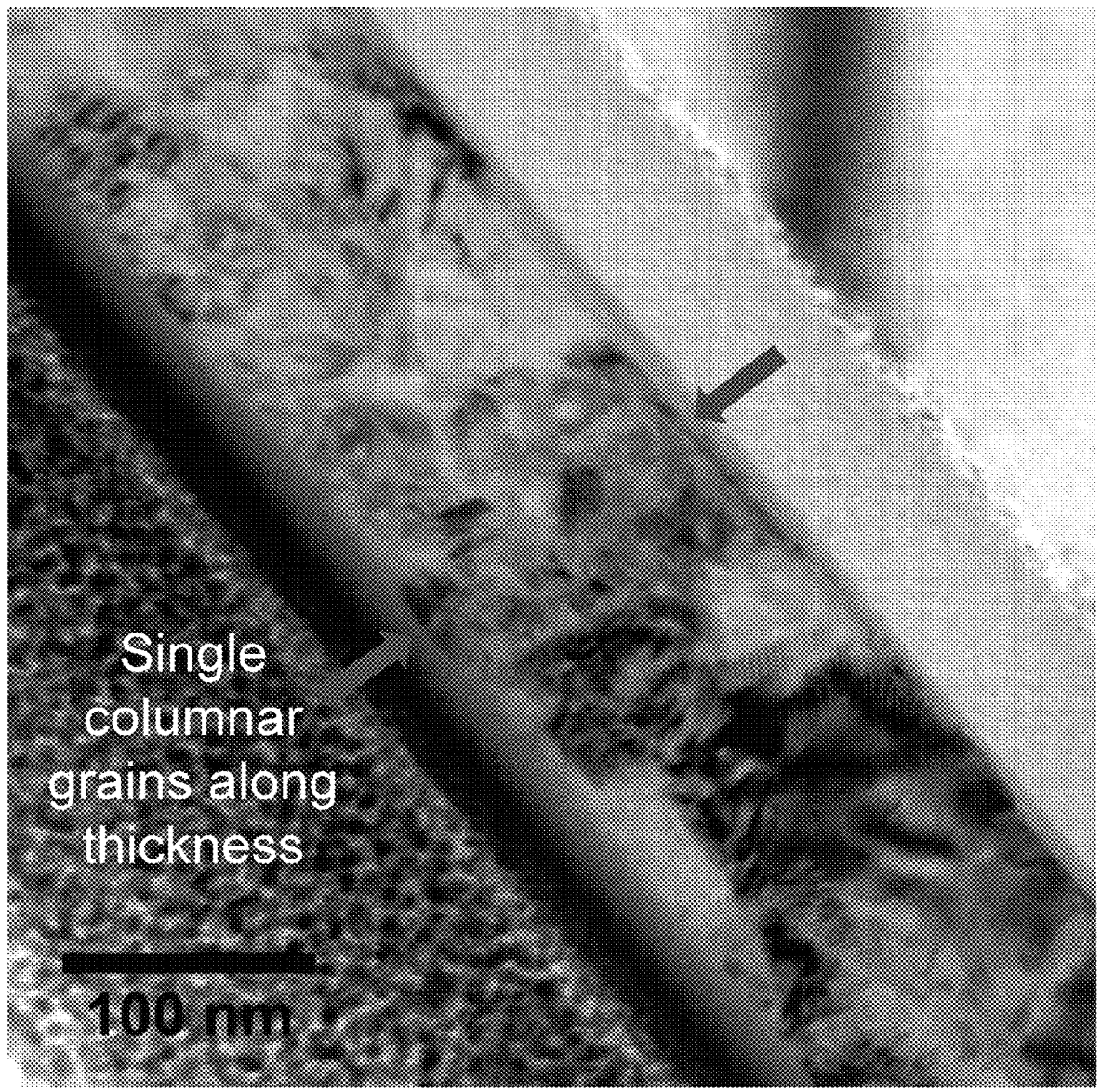
FIG. 13B illustrates a cross-sectional TEM image of 45Ti-55Al material seeded with a single seed layer of 1.0 nm Ti crystals and then annealed, in accordance with various exemplary embodiments.

With reference now to FIG. 13A, a cross-sectional TEM image of exemplary 45Ti-55Al material seeded with two seed layers of 1.0 nm Ti crystals and then annealed is shown. The cross-sectional view shows a resulting multi-layered microstructure having multiple grains along its thickness, with an equiaxed structure. In comparison, FIG. 13B shows a cross-sectional TEM image of 45Ti-55Al material seeded with a single seed layer of 1.0 nm Ti crystals and then annealed, showing a resulting microstructure having single columnar grains along its thickness.

Figure 14:
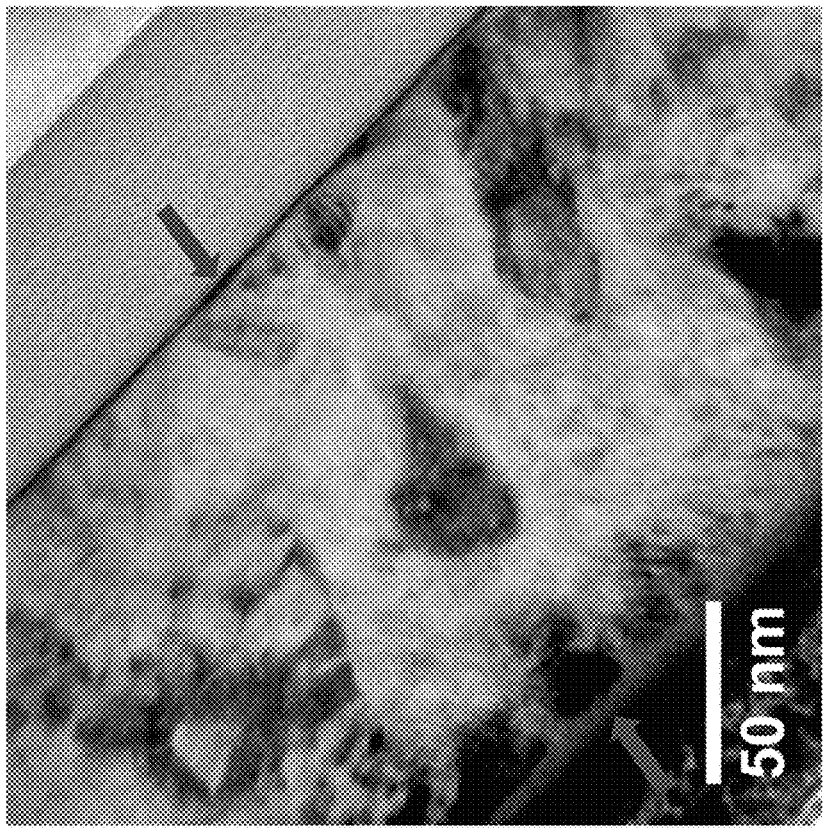
FIG. 14 illustrates two cross-sectional TEM images of 45Ti-55Al material seeded with four seed layers of 1.0 nm Ti crystals and then annealed, in accordance with various exemplary embodiments.
Figure 14:
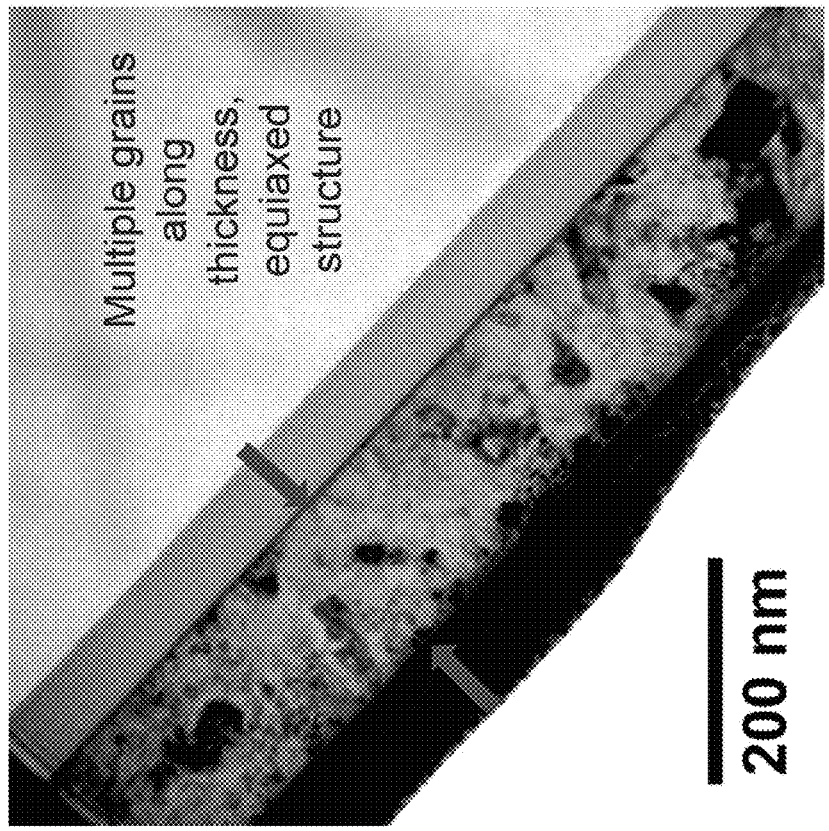

With reference to FIG. 14, and in accordance with various exemplary embodiments, cross-sectional TEM images of 45Ti-55Al material seeded with four seed layers of 1.0 nm Ti crystals and then annealed are shown. The resulting multi-layered microstructure has multiple grains along its thickness, with an equiaxed structure.

While the principles of this disclosure have been shown in various exemplary embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of any embodiment. In the claims, reference to an element in the singular is not intended to mean "one and only one" unless explicitly so stated, but rather "one or more."

Moreover, when language similar to "at least one of A, B, or C" or "at least one of A, B, and C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C. The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

Systems, methods and apparatus are provided herein. In the detailed description herein, references to "various exemplary embodiments", "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for controlled microstructure creation, the method comprising:
   depositing a first layer of amorphous TiAl material on a silicon substrate;
   forming a series of seed crystals on the first layer of amorphous TiAl material; and
   annealing the amorphous TiAl material and the seed crystals to form the microstructure, wherein the average grain size of the microstructure is less than 200 nm.

2. The method of claim 1, further comprising, prior to the annealing, depositing a second layer of amorphous TiAl material to enclose the seed crystals between the first layer of amorphous TiAl material and the second layer of amorphous TiAl material.

3. The method of claim 1, further comprising, prior to the annealing, repeating the depositing and forming to achieve a desired microstructure thickness.

4. The method of claim 1, wherein the forming further comprises controlling the spacing between the seed crystals in order to control a characteristic of the microstructure resulting from the annealing.

5. The method of claim 1, wherein the forming further comprises controlling the size of the seed crystals in order to control a characteristic of the microstructure resulting from the annealing.

6. The method of claim 1, wherein the forming further comprises depositing a layer of crystalline seed material on the first layer of amorphous TiAl material, and wherein the layer of crystalline seed material has a thickness of less than 10 nm.

7. The method of claim 1, wherein the forming further comprises depositing a thin layer of an alloy on the first layer of amorphous TiAl material while temporarily increasing the temperature of the silicon substrate.

8. The method of claim 1, wherein the forming further comprises utilizing a mask with patterned holes to control placement of the seed crystals on the first layer of amorphous TiAl material.

9. The method of claim 1, wherein the annealing is performed at a temperature between 573 Kelvin and 973 Kelvin.

10. The method of claim 1, wherein the series of seed crystals comprises at least one of crystalline Ti or crystalline Al.

11. The method of claim 10, wherein the series of seed crystals is configured with an average layer thickness of between 1.0 nm and 2.5 nm.

* * * * *